(12) United States Patent
Moughon

(10) Patent No.: US 11,614,078 B2
(45) Date of Patent: Mar. 28, 2023

(54) SPHERICAL JOURNAL BEARING FOR A WIND TURBINE DRIVETRAIN

(71) Applicant: General Electric Company, Schenectady, NY (US)

(72) Inventor: Luke Frank Moughon, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 82 days.

(21) Appl. No.: 17/079,616

(22) Filed: Oct. 26, 2020

(65) Prior Publication Data
US 2022/0128043 A1 Apr. 28, 2022

(51) Int. Cl.
*F03D 80/70* (2016.01)
*F16C 33/10* (2006.01)
*F16C 35/02* (2006.01)

(52) U.S. Cl.
CPC .......... *F03D 80/70* (2016.05); *F16C 33/103* (2013.01); *F16C 35/02* (2013.01); *F05B 2240/53* (2013.01); *F16C 2360/31* (2013.01)

(58) Field of Classification Search
CPC ........ F03D 80/70; F16C 33/103; F16C 35/02; F16C 2360/31; F05B 2240/53
See application file for complete search history.

(56) References Cited

U.S. PATENT DOCUMENTS

| 2,722,463 A | | 11/1955 | Shaw et al. | |
|---|---|---|---|---|
| 4,243,274 A | | 1/1981 | Greene | |
| 5,372,431 A | * | 12/1994 | Ide | F16C 17/035 |
| | | | | 384/122 |
| 5,503,479 A | * | 4/1996 | Ide | F16F 15/0237 |
| | | | | 384/124 |

(Continued)

FOREIGN PATENT DOCUMENTS

| EP | 0 962 676 B1 | 1/2006 |
|---|---|---|
| EP | 3252306 A1 | 12/2017 |
| WO | WO 2020/118333 A1 | 6/2020 |

OTHER PUBLICATIONS

Craighead et al., The Response of a Spherical Journal Bearing to Rotor Unbalance, Rotordynamics '92, Proceedings of the International Conference on Rotating Machine Dynamics Hotel des Bains, Venice, Apr. 28-30, 1992, pp. 406-417 Abstract Only.

(Continued)

*Primary Examiner* — Courtney D Heinle
*Assistant Examiner* — Ryan C Clark
(74) *Attorney, Agent, or Firm* — Dority & Manning, P.A.

(57) ABSTRACT

A hydrodynamic journal bearing assembly for a drivetrain of a wind turbine includes a shaft and a semispherical convex surface provided on an outer surface of the shaft, the convex surface extending circumferentially around the shaft and having a convex cross-sectional profile oriented along a longitudinal axis of the shaft. A bearing housing is arranged circumferentially around the semispherical convex surface, the bearing housing having s a reservoir in a bottom portion (Continued)

thereof for a bearing fluid. A static semispherical concave bearing surface in the bearing housing defines a bearing interface with the semispherical convex surface on the shaft, wherein a layer of the fluid is provided in the bearing interface as the shaft and rotates through the reservoir.

16 Claims, 5 Drawing Sheets

(56) References Cited

U.S. PATENT DOCUMENTS

| | | | | |
|---|---|---|---|---|
| 5,660,481 | A * | 8/1997 | Ide | F16F 15/0237 384/124 |
| 5,952,752 | A * | 9/1999 | Kim | F16C 17/105 310/90 |
| 7,675,211 | B2 * | 3/2010 | Dimascio | F03D 80/70 310/90 |
| 9,036,987 | B2 * | 5/2015 | Neumann | F16C 43/086 392/407 |
| 10,502,193 | B2 * | 12/2019 | Li | F03D 15/00 |
| 2004/0202393 | A1 * | 10/2004 | Masui | F16C 19/48 384/495 |
| 2008/0205812 | A1 * | 8/2008 | Landwehr | F16C 23/10 384/549 |
| 2012/0068460 | A1 * | 3/2012 | Wadehn | F16C 33/1075 290/44 |
| 2012/0099993 | A1 | 4/2012 | Guerenbourg et al. | |
| 2014/0050430 | A1 | 2/2014 | Murphy et al. | |
| 2015/0098825 | A1 * | 4/2015 | Wendeberg | F03D 80/70 416/174 |

OTHER PUBLICATIONS

Raharjo et al., Vibro-Acoustic Characteristic of a Self-Aligning Spherical Journal Bearing Due to Eccentric Bore Fault, The Ninth International Conference on Condition Monitoring and Machinery Failure Prevention Technologies, Research Gate, Jun. 2012, 18 Pages. Retrieved from: https://www.researchgate.net/publication/236217141.

EPO Search Report, dated Mar. 18, 2022.

* cited by examiner

SPHERICAL JOURNAL BEARING FOR A WIND TURBINE DRIVETRAIN

FIELD

The present disclosure relates in general to wind turbines, and more particularly to spherical journal bearing particularly suited for use as a main bearing in a wind turbine drivetrain.

BACKGROUND

Generally, a wind turbine includes a tower, a nacelle mounted on the tower, and a rotor coupled to drivetrain components within the nacelle. The rotor generally includes a rotatable hub and a plurality of rotor blades coupled to and extending outwardly from the hub. Each rotor blade may be spaced about the hub so as to facilitate rotating the rotor to enable kinetic energy to be converted into usable mechanical energy, which may then be transmitted to an electric generator disposed within the nacelle for the production of electrical energy. Typically, a gearbox is used to drive the electric generator in response to rotation of the rotor. For instance, the gearbox may be configured to convert a low speed, high torque input provided by the rotor to a high speed, low torque output that may drive the electric generator.

The drivetrain generally includes a plurality of bearings arranged with the rotor shaft (also referred to herein as the low-speed shaft), the pin shafts, and/or the high-speed shaft of the generator. The main bearing supports the rotatable hub and the load on the main bearing is substantial (determined in part by the weight of the blades, hub, and main shaft) and can cause deflections in the main shaft. As the size and capacity of wind turbines increase, so do the loads and demand on the main bearing.

Rolling element bearings have long been used as the main bearing in wind turbines. Particularly with increased loads, these bearings are becoming more complex and costly to manufacture, are prone to excessive wear, and require a relatively high degree of time-consuming and expensive maintenance. A significant problem with traditional roller bearing systems is that the load is supported by line contact between the rollers and raceways. Concentrating large wind turbine loads on line contacts leads to high contact pressure, which results in wear and surface damage to the bearing components.

Conventional hydrodynamic ("fluid") journal bearings are well-known and have a cylindrical construction wherein tilt pads (and associated tilt mechanisms) are disposed around the shaft. The bearing conceptually operates by supporting the load essentially entirely on a thin layer of liquid, usually oil, between the shaft and the pads. Separate axial thrust pads are also used to compensate for the changing axial load placed on the shaft. This conventional journal bearing is generally used in high-speed/low-load applications and has not generally been used for the low-speed/high-load environment of a wind turbine main bearing.

US Pat. Pub. No. 2012/0099993 proposed use of a fluid bearing for the main bearing of a wind turbine, wherein the bearing pads are arranged in an outer main bearing housing that also contains the fluid used to lubricate the bearing. The bearing pads are connected to the bearing housing by pivot bearings, such a ball-and-socket arrangement, and this type of bearing is often referred to as a "tilting-pad journal bearing." However, this bearing is quite complex and expensive to manufacture and maintain.

Despite the suggestion made in the US '993 published application, Applicant is not aware of a successful implementation of a cylindrical tilting-pad journal bearing as the main bearing in a modern wind turbine. It is believed that the complexity and costs of such a bearing are commercially prohibitive.

The industry would thus benefit from development of a journal bearing suitable for use in the low-speed/high-load application as a main bearing in a wind turbine that is commercially feasible and does not suffer the disadvantages of conventional cylindrical tilting-pad journal bearings.

BRIEF DESCRIPTION

Aspects and advantages of the invention will be set forth in part in the following description, or may be obvious from the description, or may be learned through practice of the invention.

In one aspect, the present disclosure is directed to a hydrodynamic bearing assembly for a drivetrain of a wind turbine. The bearing assembly includes a shaft and a semispherical convex surface provided on an outer surface of the shaft. The convex surface extends continuously or discontinuously around the shaft and has a convex cross-sectional profile oriented along a longitudinal axis of the shaft. A bearing housing is arranged circumferentially around the semispherical convex surface, the bearing housing having a reservoir in a bottom portion thereof for a bearing fluid, such as oil. A static semispherical concave bearing surface is provided in the bearing housing that defines a bearing interface with the semispherical convex surface on the shaft. A layer of the fluid is provided in the bearing interface as the shaft and rotates through the reservoir.

In a particular embodiment, the semispherical convex surface provided on an outer surface of the shaft is continuous around the shaft. For example, the surface may be provided a continuous ring-shaped journal that is fitted onto the outer surface of the shaft, the semispherical surface formed on the journal. The journal may press-fitted onto the shaft so as to form an interference fit with the outer surface of the shaft.

In one embodiment, the static semispherical concave bearing surface within the bearing housing may be provided by a plurality of static bearing pads mounted in the bearing housing and disposed circumferentially outboard of the semispherical convex surface on the shaft.

The bearing housing may be configured in various ways. In a particular embodiment, the bearing housing includes a first member extending circumferentially around the shaft and having a flange at a first axial end thereof. The bearing pads can be mounted within a cavity defined by the first member, while the flange provides an axial stop for the bearing pads.

The bearing housing may have a cover member mounted to a second axial end of the first member, wherein the reservoir is defined by a portion of the cavity sealed by the cover member.

In a particular embodiment, a spacer member (e.g., a block member) may be provided between each of the bearing pads and the first member. In this embodiment, the bearing pads and spacer members are sandwiched in position between the cover member and the axial stop, with the cover member bolted to the first member.

The bearing pads may include inclined axial end faces, while the cover member and the axial stop comprise inclined engagement surfaces that contact the inclined axial end faces.

The present disclosure also encompasses a wind turbine drivetrain assembly having a rotor and a main shaft rotatably coupled to the rotor. A main bearing supports the main shaft and comprises a bearing assembly in accordance with one or more of the embodiments discussed above.

The present disclosure also encompasses a wind turbine comprising the drivetrain assembly with the bearing assembly describe above.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Figure 1:
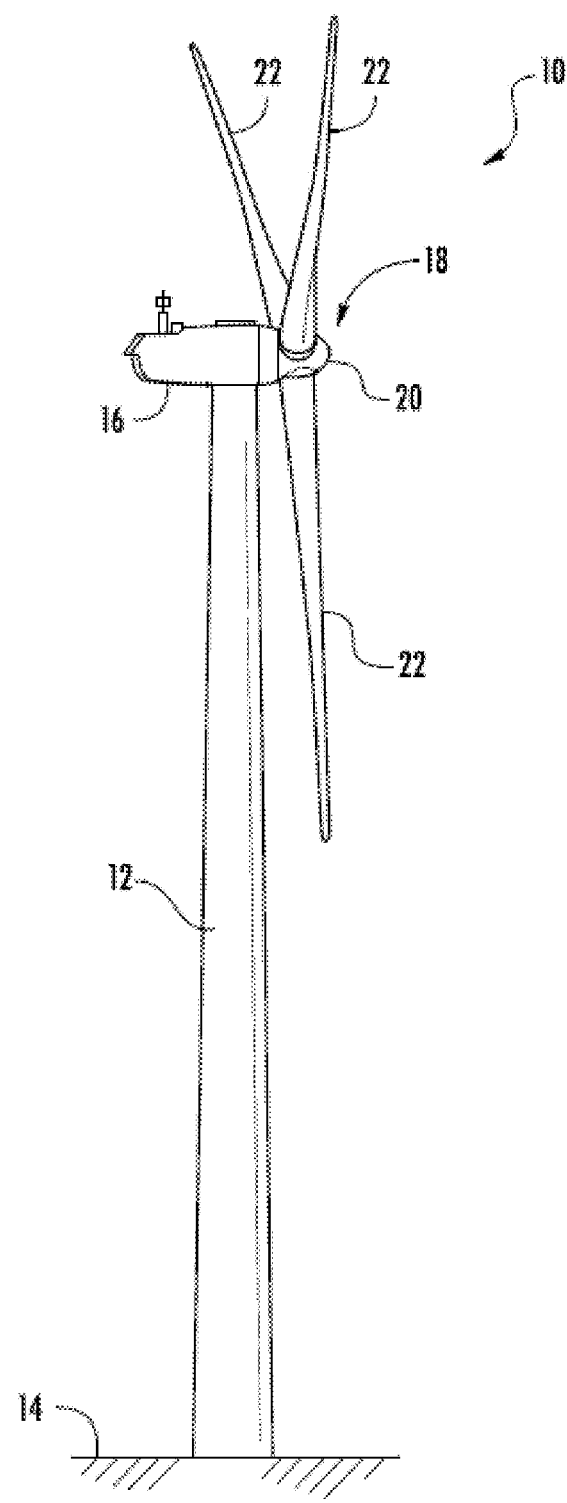
FIG. 1 illustrates a perspective view of one embodiment of a wind turbine according to the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Generally, the present disclosure is directed to a hydrodynamic (fluid) journal bearing that is particularly well-suited for use as a main bearing in the drivetrain of a wind turbine. The journal bearing is not, however, limited to a main bearing and may be used wherever a rotatable bearing is needed in the drivetrain.

As will be apparent from the following description, the proposed spherical journal bearing is essentially rigid, yet accommodates misalignment and deflection of the shaft. The bearing essentially eliminates the complexity and expense of the tilting pad mechanisms used in conventional cylindrical journal bearings. Moreover, since the spherical shape of the bearing components provides a sufficient degree of thrust capability, the spherical journal bearing eliminates the need for separate thrust pads required in conventional journal bearing systems. Also, by eliminating many moving parts, the spherical journal bearing dramatically reduces the cost of the bearing system.

Referring now to the drawings, FIG. 1 illustrates a perspective view of one embodiment of a wind turbine 10 according to the present disclosure. As shown, the wind turbine 10 includes a tower 12 extending from a support surface 14, a nacelle 16 mounted on the tower 12, and a rotor 18 coupled to the drivetrain components housed within the nacelle 16. The rotor 18 includes a rotatable hub 20 and at least one rotor blade 22 coupled to and extending outwardly from the hub 20. For example, in the illustrated embodiment, the rotor 18 includes three rotor blades 22. Each rotor blade 22 is spaced about the hub 20 to facilitate rotating the rotor 18 to enable kinetic energy to be transferred from the wind into usable mechanical energy, and subsequently, electrical energy. For instance, the hub 20 may be rotatably coupled to an electric generator 24 (FIG. 2) positioned within the nacelle 16 for producing electrical energy.

Figure 2:
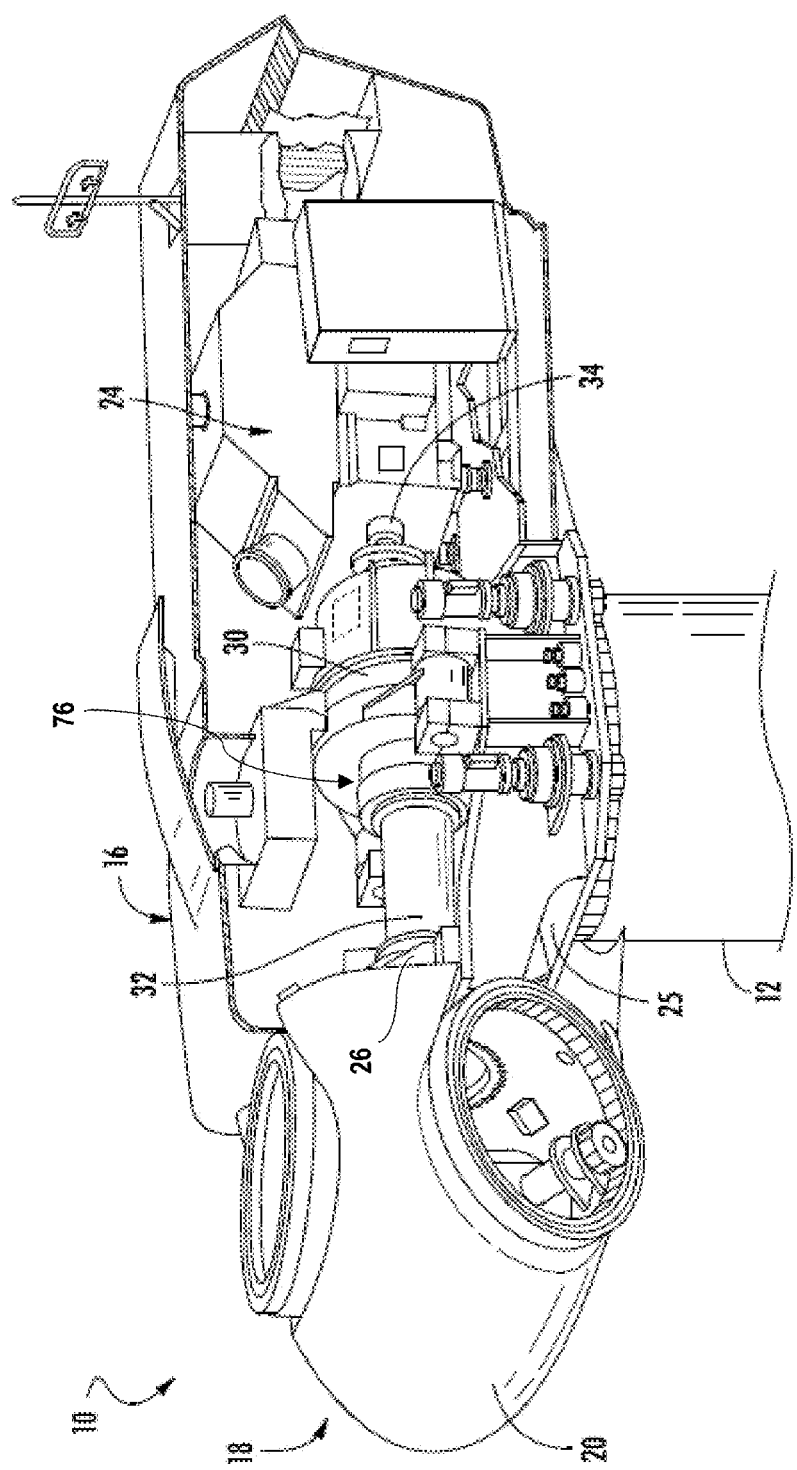
FIG. 2 illustrates a detailed, internal view of one embodiment of a nacelle of a wind turbine.

Referring now to FIG. 2, a simplified, internal view of a nacelle 16 of the wind turbine 10 according to conventional construction is illustrated. As shown, the generator 24 is located within the nacelle 16 and is coupled to the rotor 18 of the wind turbine 10 for producing electrical power from the rotational energy generated by the rotor 18. For example, as shown in the illustrated embodiment, the rotor 18 may include a rotor (main) shaft 32 coupled to the hub 20 for rotation therewith. The rotor shaft 32 is supported by a main bearing 26. The rotor shaft 32 is, in turn, rotatably coupled to a drivetrain assembly that includes a gearbox 30 with a gearbox output shaft 34 connected to the generator 24.

As is generally understood, the rotor shaft 32 supplies a low speed, high torque input to the gearbox 30 in response to rotation of the rotor blades 22 and the hub 20. Thus, the gearbox 30 includes a gear assembly that converts the low speed, high torque input to a high speed, low torque output to drive the generator shaft 34 and, thus, the generator 24.

Figure 3:
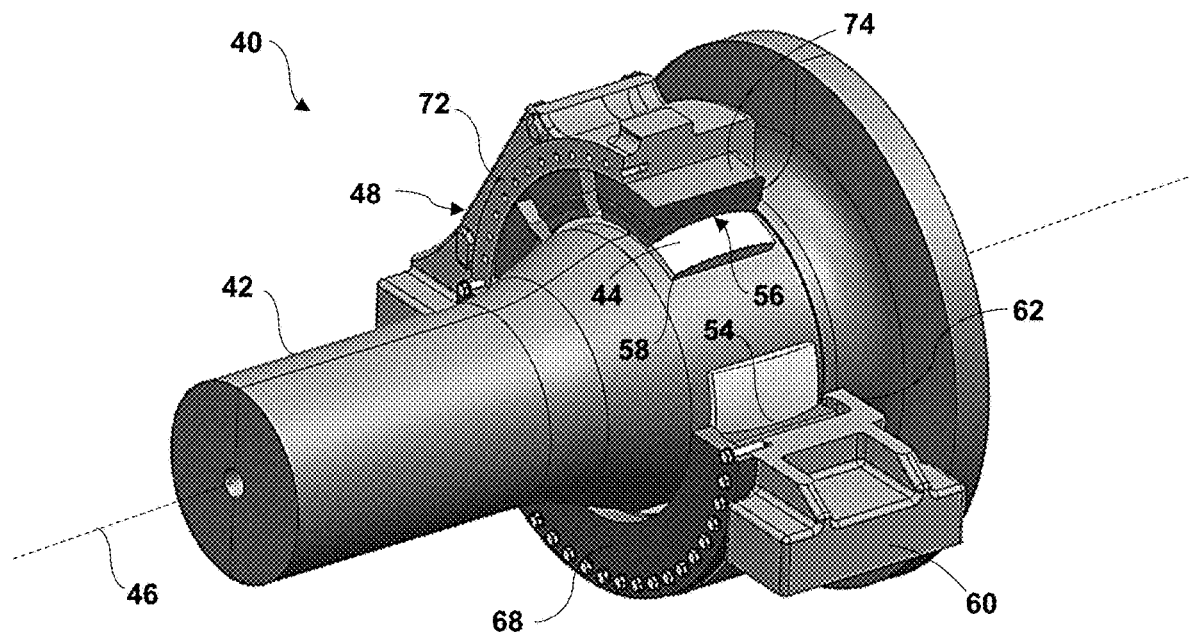
FIG. 3 is a perspective view of a hydrodynamic bearing assembly in accordance with an embodiment of the invention.

Referring now to FIGS. 3 through 6 in general, a hydrodynamic bearing assembly 40 in accordance with aspects of the present invention is depicted. The bearing assembly is particularly well-suited for use as a main bearing in a drivetrain of a wind turbine, but is not limited to this use. The bearing assembly includes a shaft 42, which may be the main shaft in the wind turbine drivetrain. A semispherical convex surface 44 is provided on an outer surface of the shaft 42. The radius of this surface can be determined based on several factors, such as the size of the shaft 42, loads on the shaft 42, expected amount of deflection of the shaft 42, as so forth. The radius may be constant or may vary along the arc-length of the convex surface 44. The semispherical convex surface 44 extends continuously or dis-continuously around the circumference of the shaft 42. The semispherical profile of the surface 44 is oriented along the longitudinal axis 46 of the shaft 42, as depicted in FIG. 3. In other words, the radius of the semispherical surface 44 is aligned/parallel with the axis 46.

A bearing housing 48 is arranged circumferentially around the semispherical convex surface 44, wherein the shaft 42 passed through the bearing housing 48. As described below, the bearing housing 48 may be a multi-component structure. The bearing housing 48 defines a reservoir 50 (FIG. 4) in a bottom portion thereof. This reservoir 50 contains a bearing fluid, such as oil. As with conventional hydrostatic journal bearings, the present bearing assembly 40 operates by supporting the load essentially entirely on a thin layer of the fluid between the shaft 42 and bearing pads 52 (described in greater detail below).

The bearing assembly 40 includes a static semispherical concave bearing surface 54 in the bearing housing 48 that defines a semispherical bearing interface 56 with the semispherical convex surface 44 on the shaft 42. The layer of fluid is provided in this bearing interface 56 as the shaft 42 rotates through the reservoir. The concave bearing surface 54 is "static" in that it is rigidly mounted in the bearing housing 48. The component(s) defining the concave bearing surface 54 do not tilt or rotate relative to the bearing housing 48.

In the embodiment illustrated in the figures, the semispherical convex surface 44 is unbroken and continuous around the shaft 42. For example, the convex surface 44 may be provided by a continuous ring-shaped journal 58 that is fitted onto the outer surface of the shaft 42, the convex surface formed on the outer circumferential surface of the journal 58. The journal 58 may be press-fitted onto the shaft 42 so as to have a frictional interference fit therewith.

Figure 4:
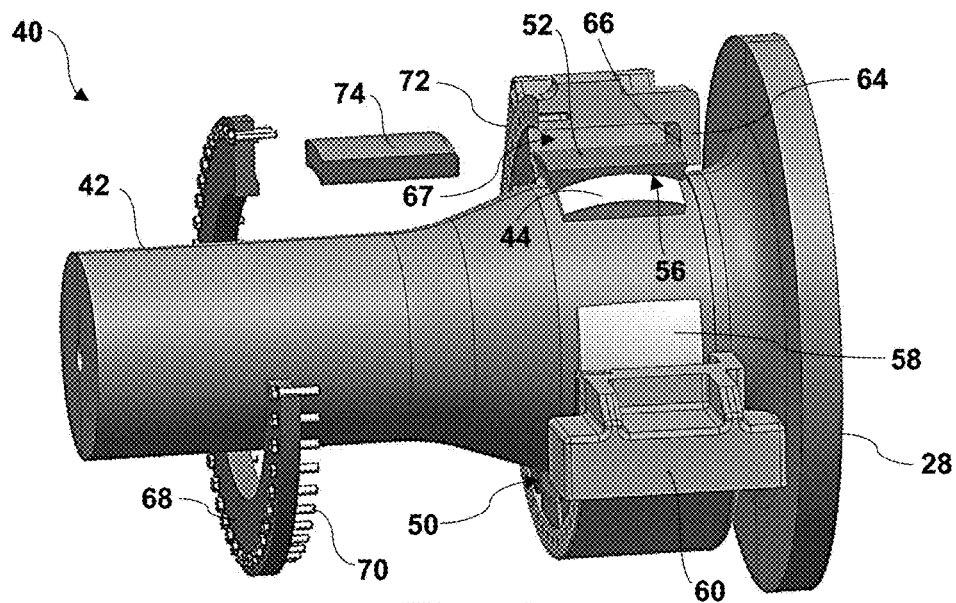
FIG. 4 is an exploded view of the bearing assembly of FIG. 3.
Figure 5:
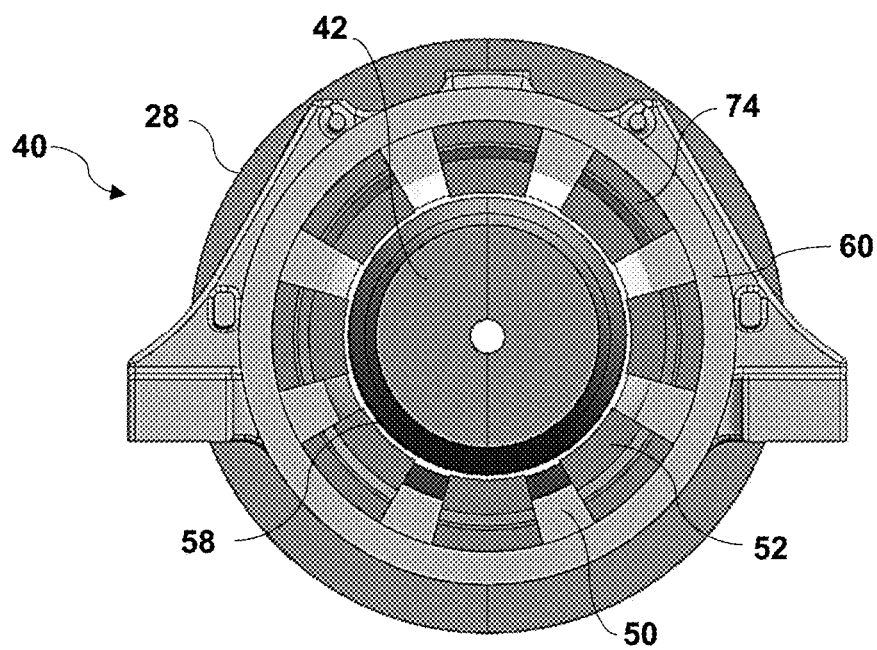
FIG. 5 is a cross-sectional end view of the bearing assembly of FIG. 3.
Figure 6:
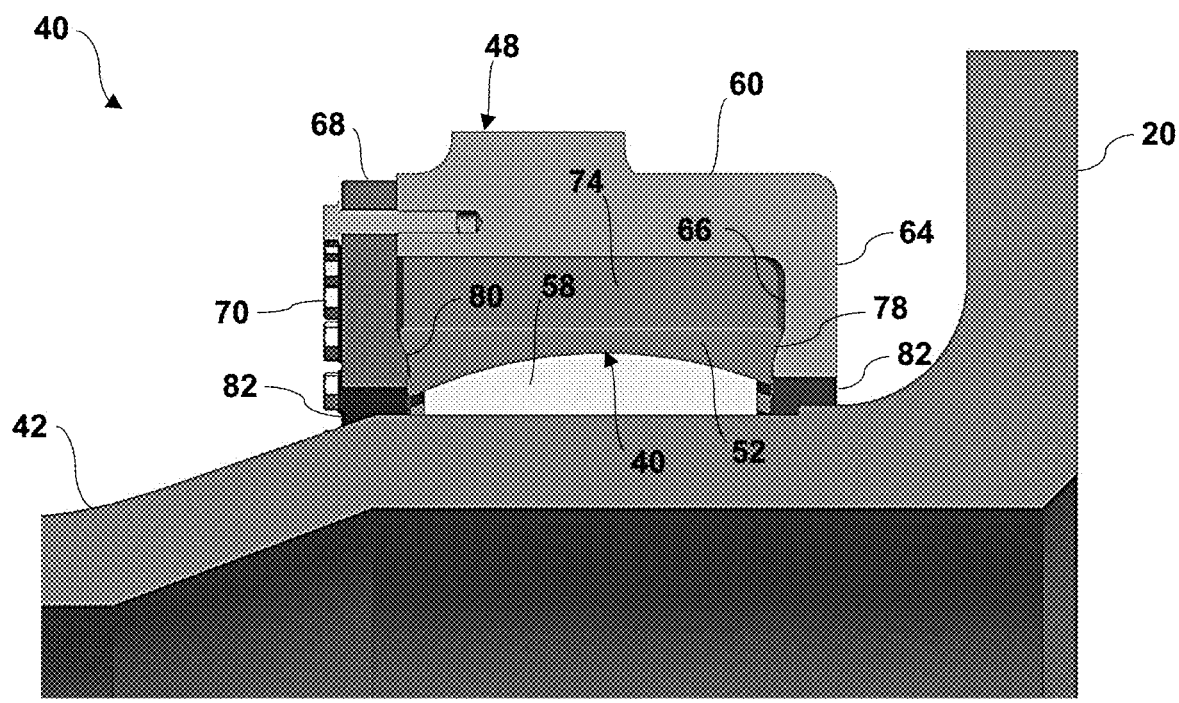
FIG. 6 is an enlarged cross-sectional view of components of the bearing assembly of FIG. 3.
Figure 7:
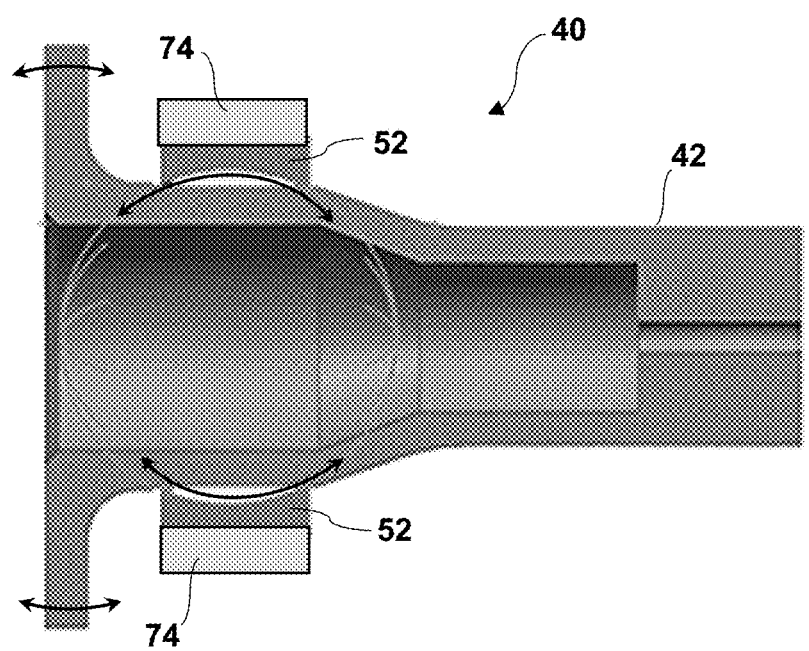
FIG. 7 is a cross-sectional view of the bearing assembly depicting deflection movement of the shaft relative to the bearing components.

In a particular embodiment depicted in the figures, the semispherical concave bearing surface 54 is provided by a plurality of static bearing pads 52 mounted in the bearing housing 48 and disposed circumferentially outboard of the semispherical convex surface 44. This can be accomplished in various ways. For example, the bearing housing 48 may include a first member 60 that extends circumferentially around the shaft 42 and has a flange 64 at a first axial end 62 thereof. The bearing pads 52 are mounted within a cavity 67 defined in the first member 60. Referring particularly to FIGS. 4 and 6, the flange 64 defines an axial stop 66 against which the bearing pads 52 are pressed in an axial direction.

The composition of bearing pads for use in journal bearings is well-known, and the present bearing pads 52 may be in accordance with any suitable conventional construction.

The bearing housing 48 may include a cover member 68 mounted (e.g., bolted) to a second axial end 72 of the first member 60. The reservoir 50 is defined by a bottom portion of the cavity 67 sealed by the cover member 68.

A spacer member 74 may in located in the cavity 67 of the bearing housing 48 between each of the bearing pads 52 and the first member 60. Referring particularly to FIG. 6. the spacer member 74 provides for easy installation and removal of the bearing pads 52 once the cover member 68 is removed from the first member 60 of the bearing housing. In the illustrated embodiment, the bearing pads 52 are essentially sandwiched in position between the cover member 68 and the axial stop 66 when the cover member 68 bolted to the first member 60. The bearing pads 52 need not be fixed directly to the first member 60 via bolts or other mechanical connections. The bearing pads 52 may include inclined axial end faces 78, while the cover member 68 and the axial stop 66 have complimentary inclined engagement surfaces 80 that contact the inclined axial end faces 78. With this configuration, as the cover member 68 is tightened against the second axial end face 72 of the first member 60, the bearing pads 52 are forced upwardly in the cavity 67 against the spacer members 74, whereby a wedge-lock is essentially formed that precisely holds the bearing pads 52 in position. When the cover member 68 is removed, the wedge-lock is released, the spacer members are removed, and the bearing pads 52 are readily accessible for inspection and/or replacement.

The present invention also encompasses a wind turbine drivetrain assembly 76 (FIG. 2) having a main shaft 32 rotatably coupled to the rotor 18. The wind turbine drivetrain assembly 76 includes an embodiment of the hydrodynamic bearing assembly 40 described herein.

Likewise, the present invention encompasses a wind turbine 10 (FIG. 1) with a drivetrain assembly 76 that includes an embodiment of the hydrodynamic bearing assembly 40 described herein.

Further aspects of the invention are provided by the subject matter of the following clauses:

Clause 1: A hydrodynamic bearing assembly for a drivetrain of a wind turbine, comprising:

a shaft;

a semispherical convex surface provided on an outer surface of the shaft, the semispherical convex surface extending circumferentially around the shaft and having a convex cross-sectional profile oriented along a longitudinal axis of the shaft;

a bearing housing arranged circumferentially around the semispherical convex surface, the bearing housing comprising a reservoir in a bottom portion thereof for a bearing fluid; and a static semispherical concave bearing surface in the bearing housing that defines a bearing interface with the semispherical convex surface on the shaft, wherein a layer of the fluid is provided in the bearing interface as the shaft and rotates through the reservoir.

Clause 2. The hydrodynamic bearing assembly as in Clause 1, wherein the semispherical convex surface provided on the outer surface of the shaft is continuous around the shaft.

Clause 3. The hydrodynamic bearing assembly as in Clause 2, wherein the semispherical convex surface comprises a ring-shaped journal fitted onto the outer surface of the shaft, the semispherical surface formed on the journal.

Clause 4. The hydrodynamic bearing assembly as in Clause 3, wherein the journal is a continuous member having a press-fitted interference fit with the outer surface of the shaft.

Clause 5. The hydrodynamic bearing assembly as in Clause 1, wherein the static semispherical concave bearing surface comprises a plurality of static bearing pads mounted in the bearing housing and disposed circumferentially outboard of the semispherical convex surface.

Clause 6. The hydrodynamic bearing assembly as in Clause 5, wherein the bearing housing comprises a first member extending circumferentially around the shaft and comprising a flange at a first axial end thereof, the bearing pads mounted within a cavity defined by the first member, the flange providing an axial stop for the bearing pads.

Clause 7. The hydrodynamic bearing assembly as in Clause 6, wherein the bearing housing comprises a cover member mounted to a second axial end of the first member, the reservoir defined by a portion of the cavity sealed by the cover member.

Clause 8. The hydrodynamic bearing assembly as in Clause 7, further comprising a spacer member between each of the bearing pads and the first member.

Clause 9. The hydrodynamic bearing assembly as in Clause 8, wherein the bearing pads are sandwiched in position between the cover member and the axial stop, the cover member bolted to the first member.

Clause 10. The hydrodynamic bearing assembly as in Clause 9, wherein the bearing pads comprise inclined axial end faces, and the cover member and the axial stop comprise inclined engagement surfaces that contact the inclined axial end faces.

Clause 11. A wind turbine drivetrain assembly, comprising:

a rotor;
a main shaft rotatably coupled to the rotor;
a bearing assembly supporting the main shaft, the bearing assembly comprising:
a semispherical convex surface provided on an outer surface of the shaft, the semispherical convex surface extending circumferentially around the shaft and having a convex cross-sectional profile oriented along a longitudinal axis of the shaft;
a bearing housing arranged circumferentially around the semispherical convex surface, the bearing housing comprising a reservoir in a bottom portion thereof for a bearing fluid; and
a static semispherical concave bearing surface in the bearing housing that defines a bearing interface with the semispherical convex surface on the shaft, wherein a layer of the fluid is provided in the bearing interface as the shaft and rotates through the reservoir.

Clause 12. The wind turbine drivetrain assembly as in Clause 11, wherein the semispherical convex surface provided on the outer surface of the shaft is continuous around the shaft.

Clause 13. The wind turbine drivetrain assembly as in Clause 12, wherein the semispherical convex surface comprises a ring-shaped journal fitted onto the outer surface of the shaft, the semispherical surface formed on the journal.

Clause 14. The wind turbine drivetrain assembly as in Clause 13, wherein the journal is a continuous member having a press-fitted interference fit with the outer surface of the shaft.

Clause 15. The wind turbine drivetrain assembly as in Clause 11, wherein the static semispherical concave bearing surface comprises a plurality of static bearing pads mounted in the bearing housing and disposed circumferentially outboard of the semispherical convex surface.

Clause 16. The wind turbine drivetrain assembly as in Clause 15, wherein the bearing housing comprises a first member extending circumferentially around the shaft and comprising a flange at a first axial end thereof, the bearing pads mounted within a cavity defined by the first member, the flange providing an axial stop for the bearing pads.

Clause 17. The wind turbine drivetrain assembly as in Clause 16, wherein the bearing housing comprises a cover member mounted to a second axial end of the first member, the reservoir defined by a portion of the cavity sealed by the cover member.

Clause 18. The wind turbine drivetrain assembly as in Clause 17, further comprising a spacer member between each of the bearing pads and the first member.

Clause 19. The wind turbine drivetrain assembly as in Clause 18, wherein the bearing pads are sandwiched in position between the cover member and the axial stop, the cover member bolted to the first member, the bearing pads comprising inclined axial end faces, and the cover member and the axial stop comprising inclined engagement surfaces that contact the inclined axial end faces.

Clause 20. A wind turbine, comprising the drivetrain assembly as in Clause 11.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art and are intended to be within the scope of the claims if they include structural elements that do not differ from the literal language of the claims, or if they include equivalent structural elements with insubstantial differences from the literal languages of the claims.

What is claimed is:

1. A hydrodynamic bearing assembly for a drivetrain of a wind turbine, comprising:
a shaft;
a semispherical convex surface provided on an outer surface of the shaft so as to rotate with the shaft, the semispherical convex surface extending circumferentially around the shaft and having a convex cross-sectional profile oriented along a longitudinal axis of the shaft;
a bearing housing arranged circumferentially around the semispherical convex surface, the bearing housing comprising a reservoir in a bottom portion thereof for a bearing fluid;
a static semispherical concave bearing surface in the bearing housing that defines a bearing interface with the rotatable semi spherical convex surface on the shaft; wherein a layer of the fluid is provided in the bearing interface as the shaft and rotates through the reservoir;
wherein the static semispherical concave bearing surface comprises a plurality of static bearing pads mounted in the bearing housing between a cover member and an axial stop, the bearing members disposed circumferentially outboard of the semispherical convex surface; and
wherein the bearing pads comprise inclined axial end faces, and the cover member and the axial stop comprise inclined engagement surfaces that contact the inclined axial end faces.

2. The hydrodynamic bearing assembly as in claim 1, wherein the semispherical convex surface provided on the outer surface of the shaft is continuous around the shaft.

3. The hydrodynamic bearing assembly as in claim 2, wherein the semispherical convex surface comprises a ring-shaped journal fitted onto the outer surface of the shaft, the semispherical surface formed on the journal.

4. The hydrodynamic bearing assembly as in claim 3, wherein the journal is a continuous member having a press-fitted interference fit with the outer surface of the shaft.

5. The hydrodynamic bearing assembly as in claim 1, wherein the bearing housing comprises a first member extending circumferentially around the shaft and comprising a flange at a first axial end thereof, the bearing pads mounted within a cavity defined by the first member, the flange providing the axial stop for the bearing pads.

6. The hydrodynamic bearing assembly as in claim 5, wherein the bearing housing comprises a cover member mounted to a second axial end of the first member, the reservoir defined by a portion of the cavity sealed by the cover member.

7. The hydrodynamic bearing assembly as in claim 6, further comprising a spacer member between each of the bearing pads and the first member.

8. The hydrodynamic bearing assembly as in claim 7, wherein the bearing pads are sandwiched in position between the cover member and the axial stop, the cover member bolted to the first member.

9. A wind turbine drivetrain assembly, comprising:
a rotor;
a main shaft rotatably coupled to the rotor;
a bearing assembly supporting the main shaft, the bearing assembly comprising:

a semispherical convex surface provided on an outer surface of the shaft so as to rotate with the shaft, the semispherical convex surface extending circumferentially around the shaft and having a convex cross-sectional profile oriented along a longitudinal axis of the shaft;

a bearing housing arranged circumferentially around the semispherical convex surface, the bearing housing comprising a reservoir in a bottom portion thereof for a bearing fluid; and a static semispherical concave bearing surface in the bearing housing that defines a bearing interface with the semispherical convex surface on the shaft, wherein a layer of the fluid is provided in the bearing interface as the shaft and rotates through the reservoir;

wherein the static semispherical concave bearing surface comprises a plurality of static bearing pads mounted in the bearing housing and disposed circumferentially outboard of the semispherical convex surface; and wherein the bearing pads are sandwiched in position between a cover member and an axial stop of the bearing housing, the bearing pads comprising inclined axial end faces and the cover member and the axial stop comprising inclined engagement surfaces that contact the inclined axial end faces.

10. The wind turbine drivetrain assembly as in claim 9, wherein the semispherical convex surface provided on the outer surface of the shaft is continuous around the shaft.

11. The wind turbine drivetrain assembly as in claim 10, wherein the semi spherical convex surface comprises a ring-shaped journal fitted onto the outer surface of the shaft, the semispherical surface formed on the journal.

12. The wind turbine drivetrain assembly as in claim 11, wherein the journal is a continuous member having a press-fitted interference fit with the outer surface of the shaft.

13. The wind turbine drivetrain assembly as in claim 9, wherein the bearing housing comprises a first member extending circumferentially around the shaft and comprising a flange at a first axial end thereof, the bearing pads mounted within a cavity defined by the first member, the flange providing the axial stop for the bearing pads.

14. The wind turbine drivetrain assembly as in claim 13, wherein the bearing housing comprises a cover member mounted to a second axial end of the first member, the reservoir defined by a portion of the cavity sealed by the cover member.

15. The wind turbine drivetrain assembly as in claim 14, further comprising a spacer member between each of the bearing pads and the first member.

16. A wind turbine, comprising the drivetrain assembly as in claim 9.

* * * * *